Sept. 4, 1951 T. K. ZEVELY 2,566,787

STRIPPING MECHANISM FOR BLOCK MOLDING MACHINES

Filed April 22, 1949 11 Sheets-Sheet 1

INVENTOR.
Thomas K. Zevely.
BY
Cameron, Kerkam + Sutton
ATTORNEYS

Sept. 4, 1951 T. K. ZEVELY 2,566,787

STRIPPING MECHANISM FOR BLOCK MOLDING MACHINES

Filed April 22, 1949 11 Sheets-Sheet 2

INVENTOR.

Thomas K. Zevely.

BY

Cameron, Kerkam & Sutton

ATTORNEYS

Sept. 4, 1951 T. K. ZEVELY 2,566,787

STRIPPING MECHANISM FOR BLOCK MOLDING MACHINES

Filed April 22, 1949 11 Sheets-Sheet 3

INVENTOR.
Thomas K. Zevely.
BY
Cameron, Kerkam & Sutton
ATTORNEYS

INVENTOR

Thomas K. Zevely.

BY Cameron, Kerkam & Sutton

ATTORNEYS

Sept. 4, 1951 T. K. ZEVELY 2,566,787

STRIPPING MECHANISM FOR BLOCK MOLDING MACHINES

Filed April 22, 1949 11 Sheets-Sheet 5

INVENTOR.
Thomas K. Zevely.
BY
Cameron, Kerkam & Sutton
ATTORNEYS

Sept. 4, 1951 T. K. ZEVELY 2,566,787

STRIPPING MECHANISM FOR BLOCK MOLDING MACHINES

Filed April 22, 1949 11 Sheets-Sheet 6

INVENTOR.
Thomas K. Zevely.
BY
Cameron, Kerkam & Sutton
ATTORNEYS

Sept. 4, 1951 T. K. ZEVELY 2,566,787

STRIPPING MECHANISM FOR BLOCK MOLDING MACHINES

Filed April 22, 1949 11 Sheets-Sheet 7

INVENTOR.
Thomas K. Zevely.
BY
Cameron, Kerkam & Sutton
ATTORNEYS

Sept. 4, 1951 T. K. ZEVELY 2,566,787

STRIPPING MECHANISM FOR BLOCK MOLDING MACHINES

Filed April 22, 1949 11 Sheets-Sheet 8

INVENTOR.
Thomas K. Zevely.
BY
Cameron, Kerkam & Sutton
ATTORNEYS

INVENTOR.
Thomas K. Zevely.
BY
Cameron, Kerkam & Sutton
ATTORNEYS

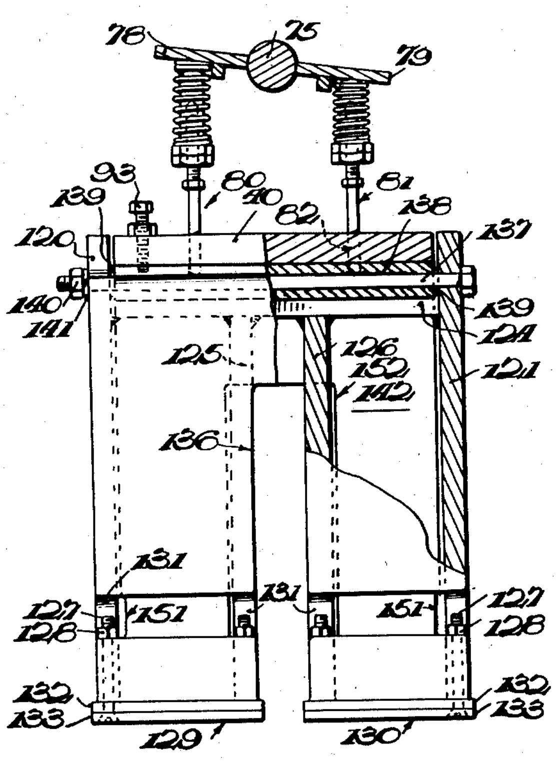
Fig. 13.
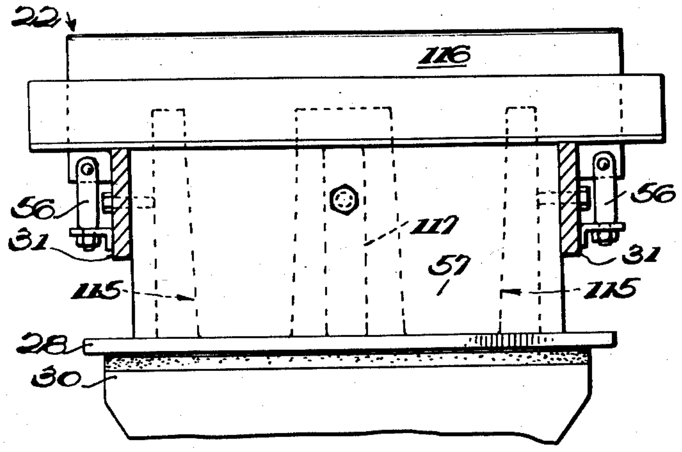
INVENTOR.
Thomas K. Zevely.
BY
Cameron, Kerkam & Sutton
ATTORNEYS Sept. 4, 1951 T. K. ZEVELY 2,566,787

STRIPPING MECHANISM FOR BLOCK MOLDING MACHINES

Filed April 22, 1949 11 Sheets-Sheet 11

INVENTOR.
Thomas K. Zevely.
BY
Cameron, Kerkam & Sutton
ATTORNEYS

Patented Sept. 4, 1951 2,566,787

UNITED STATES PATENT OFFICE 2,566,787

STRIPPING MECHANISM FOR BLOCK MOLDING MACHINES

Thomas K. Zevely, Washington, D. C., assignor, by mesne assignments, to Besser Manufacturing Co., Alpena, Mich., a corporation of Michigan Application April 22, 1949, Serial No. 88,964

33 Claims. (Cl. 25—41)

This invention relates to machines for molding cored or hollow building blocks of cinder, slag, concrete and like materials, and is particularly directed to mechanism for automatically stripping such blocks from the molds in which they are formed.

In prior block molding machines of the type wherein the mold cores are supported by core bars extending across the top of the mold box and the finished blocks are ejected by either raising the mold box relatively to the block-supporting pallet or lowering the pallet relatively to the mold box, it is customary to engage the tops of the blocks with stripper heads to facilitate the stripping operation and at the same time smooth and compact the upper surfaces of the blocks. In the interest of simplicity, the following description will generally refer to machines of the type wherein the mold box remains stationary and the stripping mechanism and block-supporting pallets move vertically during the stripping operation.

Due to the presence of the core bars, two or more stripper heads must be provided for each block, the heads being spaced apart sufficiently to receive the core bars therebetween as the heads move downwardly to engage the tops of the blocks and strip them from the mold box. Since the stripper heads are fixed at their upper ends to the plate by which they are supported and given their vertical movement, the stripper shoes at the lower ends of the heads are always separated by spaces approximately equal to the width of the core bars. The result is that the moldable block-forming material or aggregate lying directly beneath the core bars is not engaged by the stripper shoes and compressed or packed thereby to the same extent as the rest of the upper faces of the blocks, and when the blocks are cured, cracks or weakened areas frequently develop at these points. Even when the cracks or faults do not develop sufficiently to seriously impair the strength of the blocks, the failure of the stripper shoes to engage these portions of the blocks leaves noticeable irregularities in the otherwise smooth surfaces of the blocks which are detrimental from the standpoint of appearance. These defects, resulting from the use of stripping devices of the character heretofore known, are particularly serious in the case of large blocks having relatively small numbers of cores and relatively thin walls, and are magnified when the blocks are made of slag and similar materials which are not as free-flowing or plastic as cinder and like aggregates, but which are coming into more extensive use now that the available supply of cinders is decreasing due to the increasing use by industry of fuels other than ordinary coal for power generating purposes.

The rigidity of the stripper heads in present block molding machines also contributes materially to the wear of the mold box division plates and liners, because any vertical misalignment of the stripper heads and the elements of the mold box results in undesirable frictional contact therebetween as the stripper heads move up and down and consequent excessive wear of the division plates and liners. And since the greatest wear occurs at the top of the mold box where the stripper heads first come into contact therewith, the upper portions of the blocks become larger as the wear increases and thereby make the stripping operation more difficult.

The present invention is therefore directed to the provision of a new and improved stripping mechanism for automatic block molding machines of the character described which will effectively level and compact the material of the blocks uniformly over the entire area of their upper faces so as to leave no weak points or observable surface irregularities therein which would impair either the strength or the appearance of the blocks.

In pursuing this principal object of the invention, it is proposed to provide novel means for automatically opening and closing the gaps between the stripper shoes as the heads move upwardly and downwardly so as to enable the shoes to pass around the core bars, but to come together therebeneath and engage the entire upper surfaces of the blocks as they are being formed in the mold and during the stripping operation.

Another object of the invention is to so support the stripper heads that they are capable of a yielding lateral movement in the event that misalignment with the mold box division plates or liners should occur, and thereby minimize the wear that would otherwise take place due to such misalignment.

A further object is to provide a new and improved stripping mechanism which can be readily installed in known types of block molding machines in place of the conventional stripping means heretofore used.

Still another object is to incorporate in the stripping mechanism of the present invention a novel form of stripper shoe which will increase the service life thereof and is also adapted to facilitate packing of the block-forming material in the areas immediately below the core bars.

These and other objects will appear more fully upon consideration of the detailed description of the embodiments of the invention which follows. Although only two specific forms of mechanism are described and illustrated in the accompanying drawings, it is to be expressly understood that these drawings are for the purpose of illustration only and are not to be construed as defining the scope of the invention, for which latter purpose reference should be had to the appended claims.

Referring now to the drawings, wherein like reference characters indicate like parts throughout the several views.

Figures 8, 8A, 9, 9A:
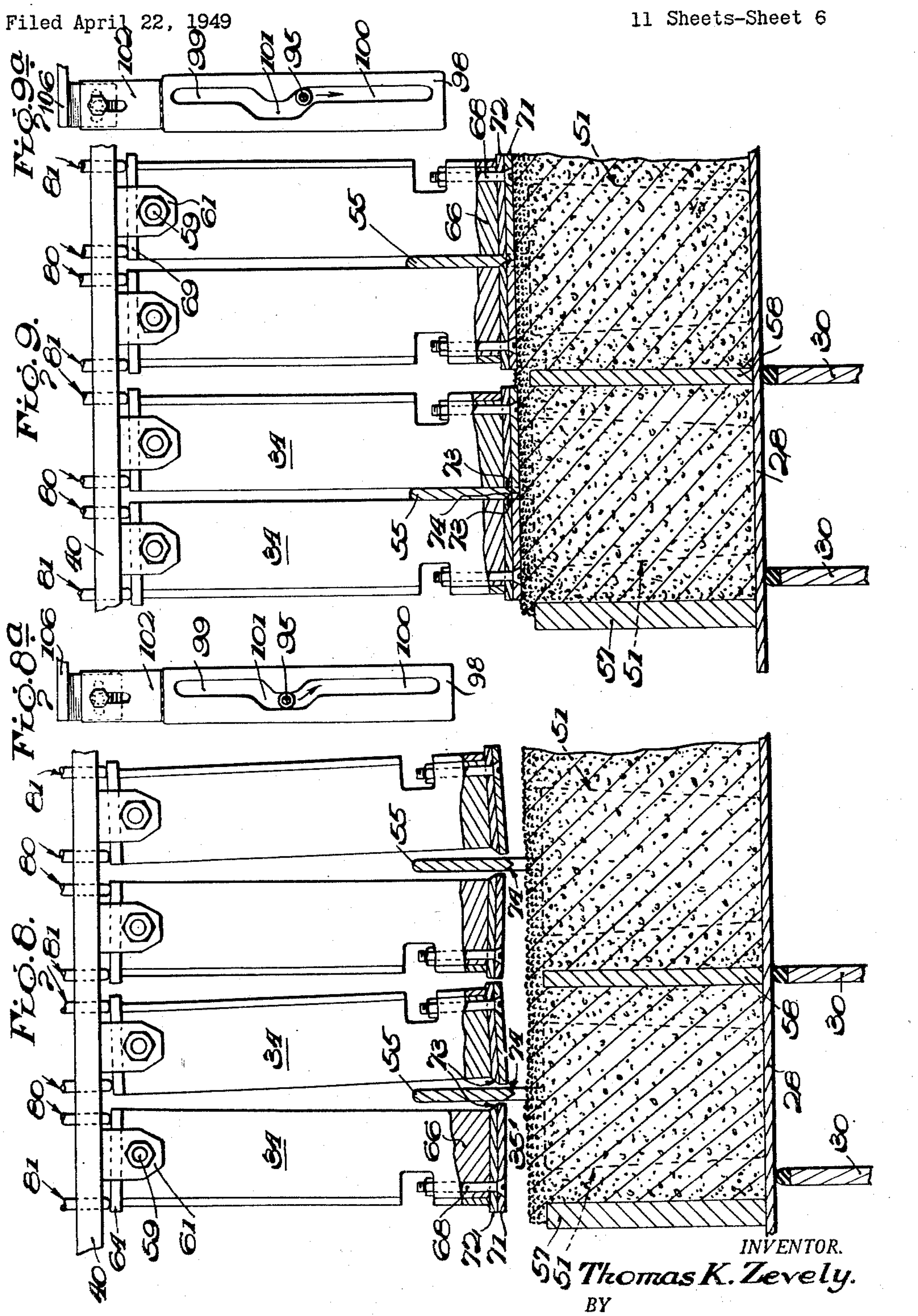
Figs. 8, 9 and 10 are fragmentary front views, partially in section, of the stripper heads and mold box indicating the relative positions of the parts at different points in the cycle of movement of the stripping mechanism.
Figures 10, 10A, 15:
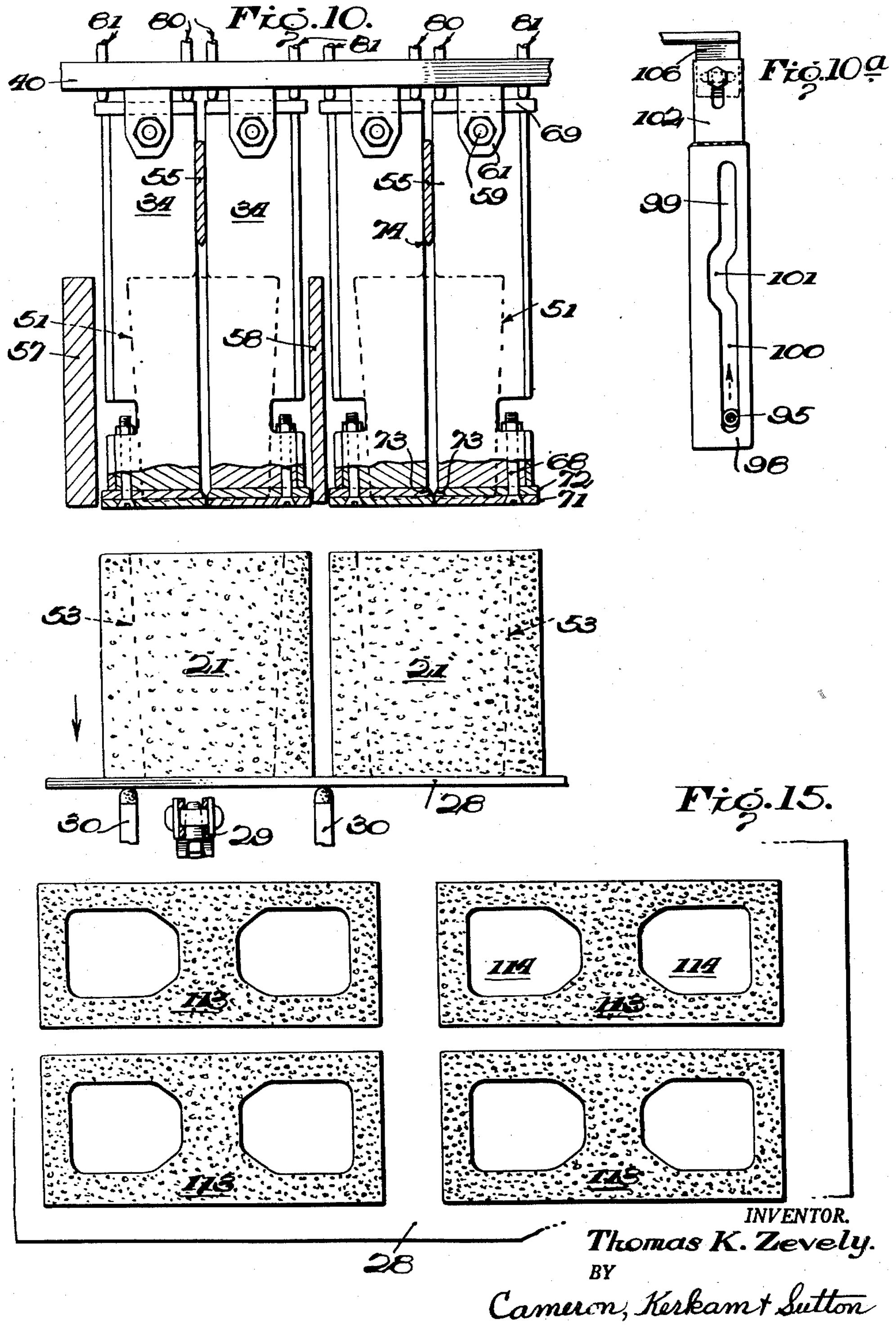
Figure 11:
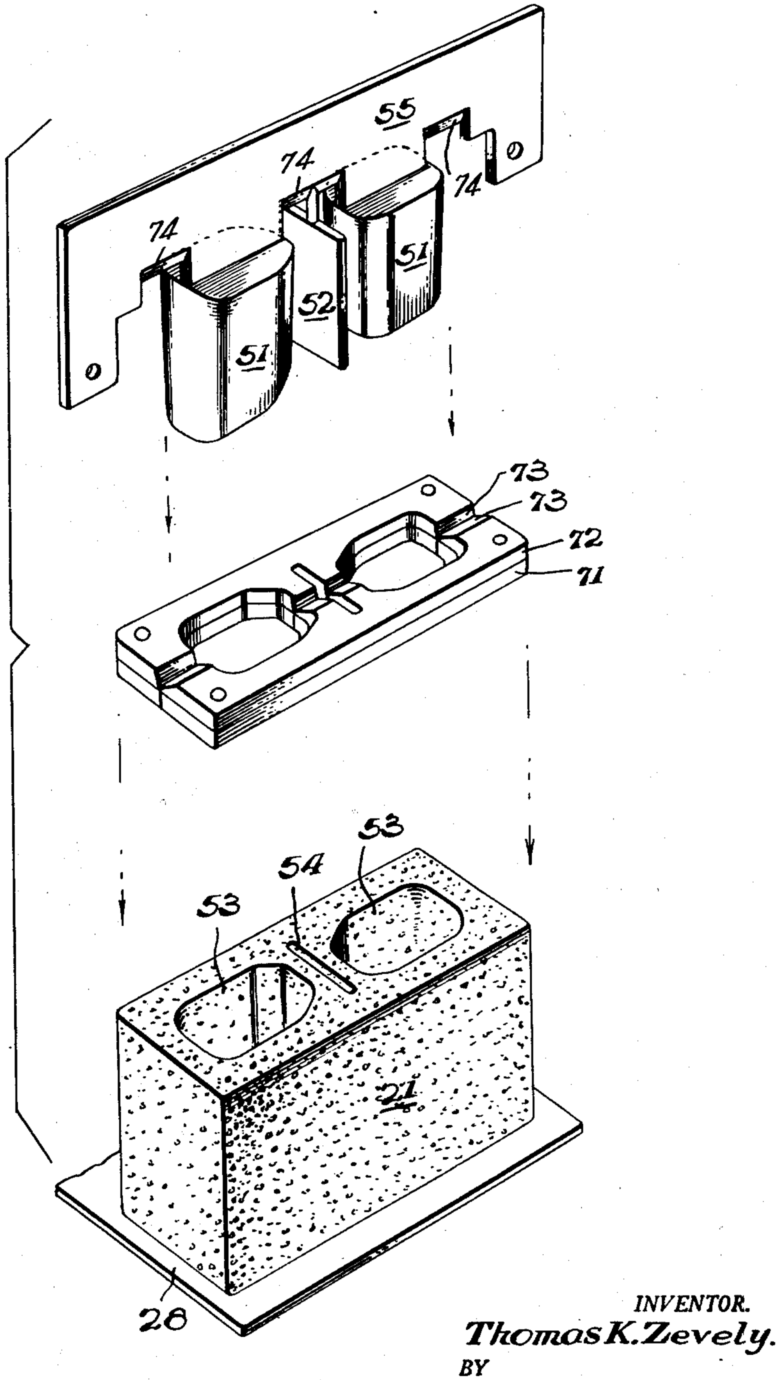
Figure 12:
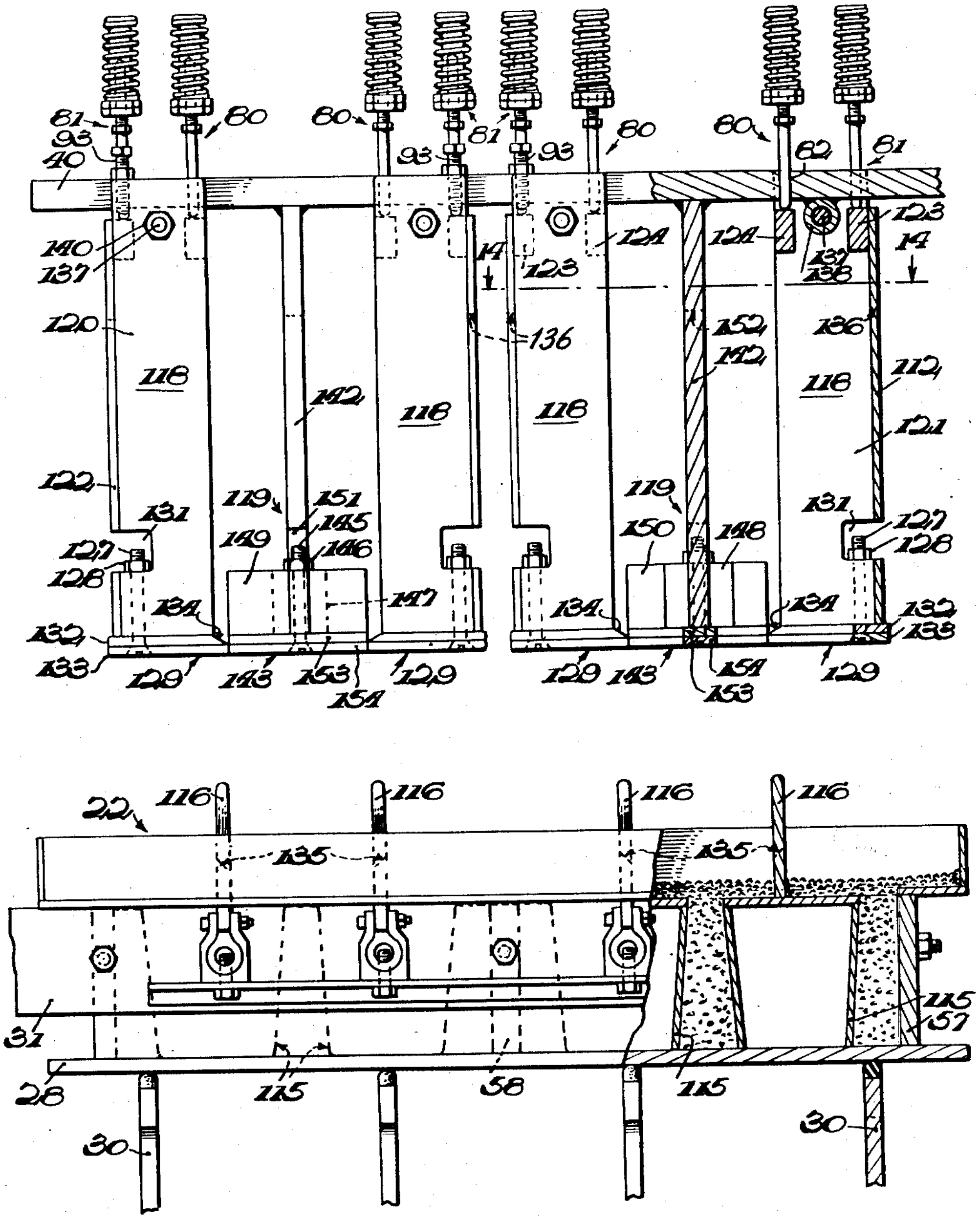
Figure 14:
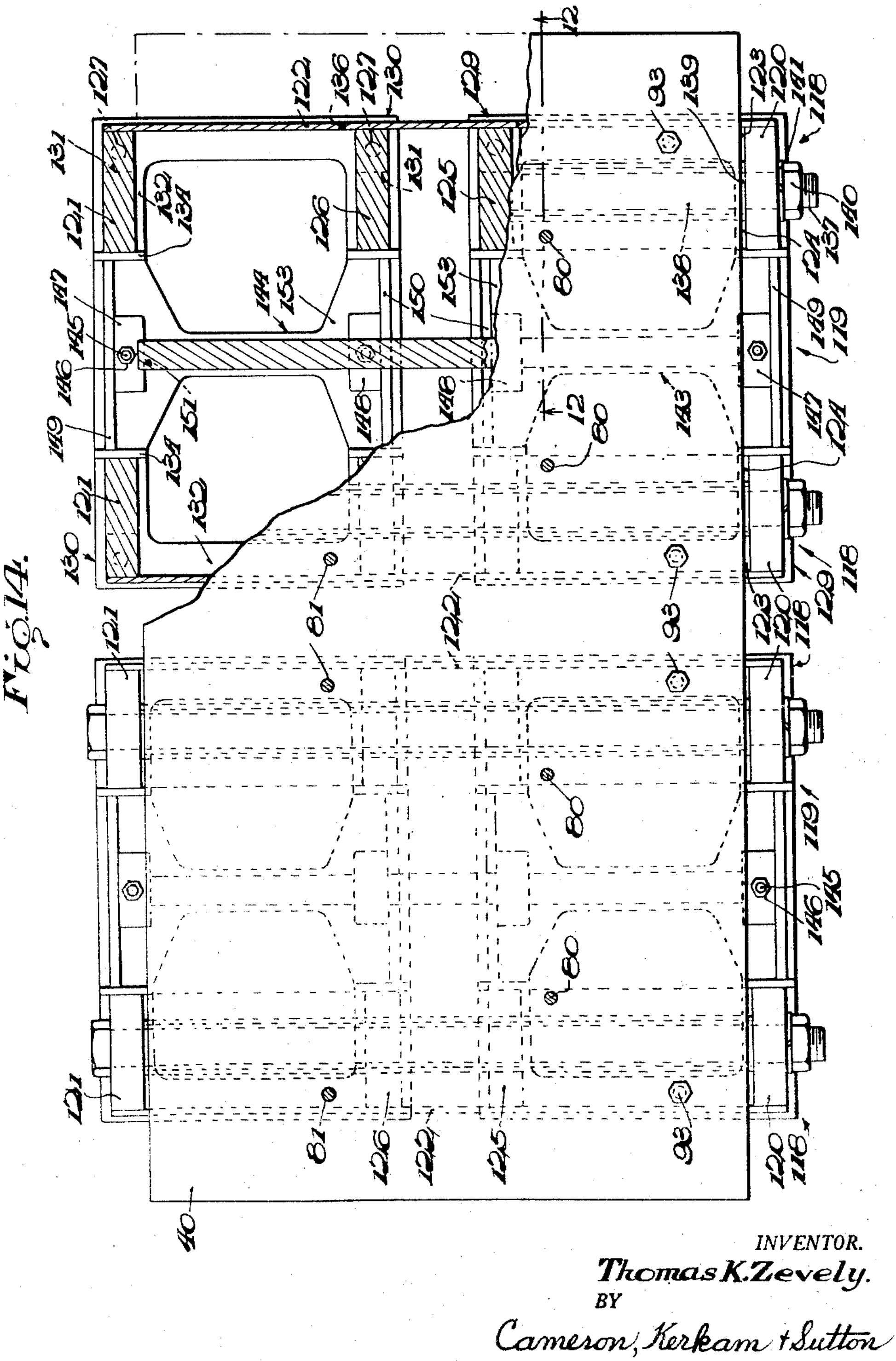

Figs. 8*a*, 9*a* and 10*a* are fragmentary side views indicating the relative positions of the cam roller and groove which control the lateral movements of the stripper heads corresponding to the positions of the elements shown in Figs. 8, 9 and 10, respectively;

Fig. 11 is an exploded perspective view of the core bar assembly and the stripper shoes of the embodiment of the invention illustrated in Figs. 1–10, this view also showing the form of block produced by that mechanism and indicating the manner in which the stripper shoes cooperate with one another and with the core bar assembly in providing complete and uniform leveling and compacting of the upper surface of the block;

Figs. 12, 13 and 14 are a front elevation, side elevation and plan view, respectively, of a modified form of stripping mechanism embodying the present invention, including the associated mold box, certain parts being broken away or entirely omitted and other parts being shown in section, in order to clearly illustrate the essential characteristics of the structure; and Fig. 15 is a plan view of the group of blocks produced by the mechanism of Figs. 12–14.

Figure 1:
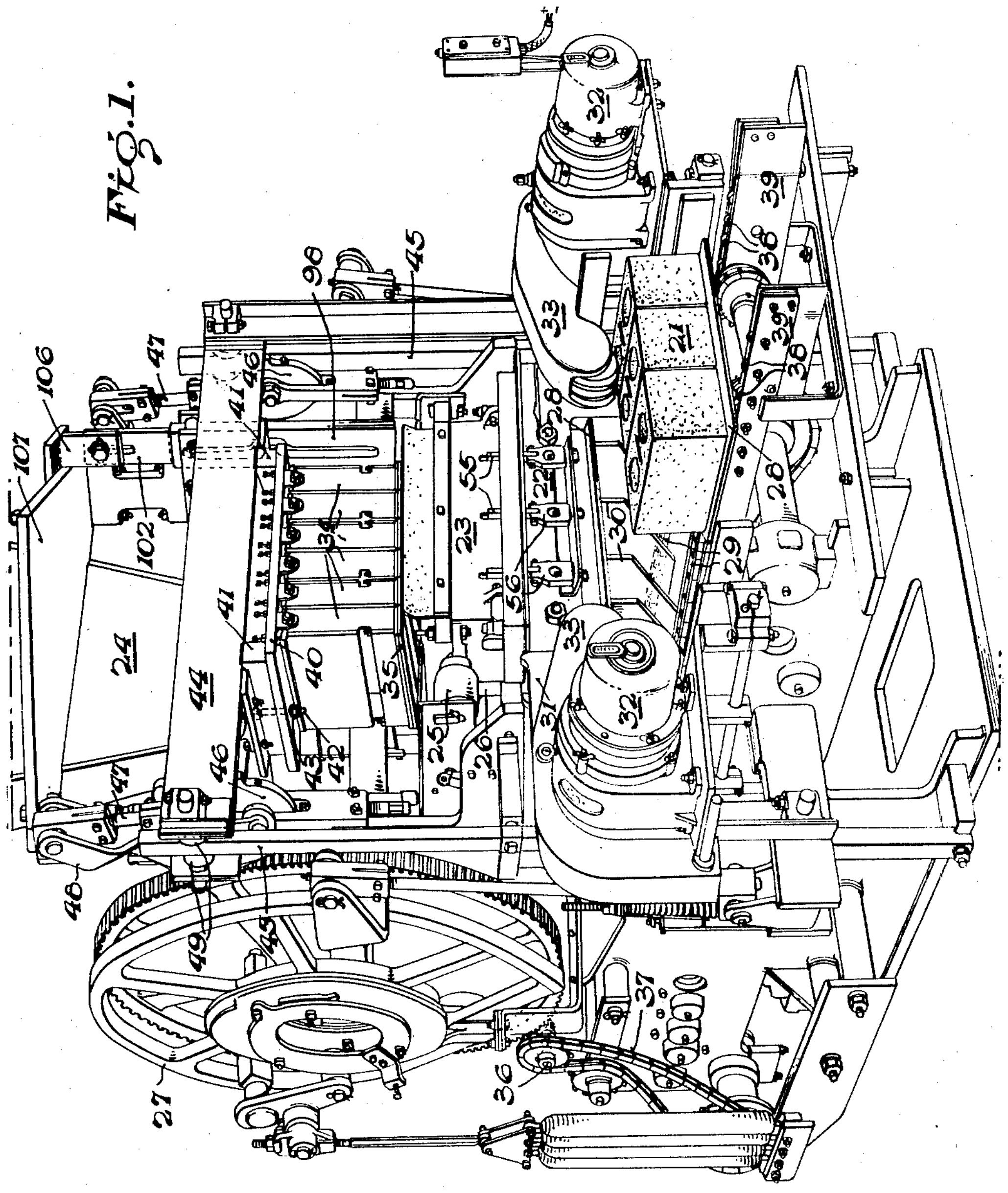
Fig. 1 is a perspective view of a well known type of automatic block molding machine in which one form of stripping mechanism embodying the present invention has been incorporated.
Figure 2:
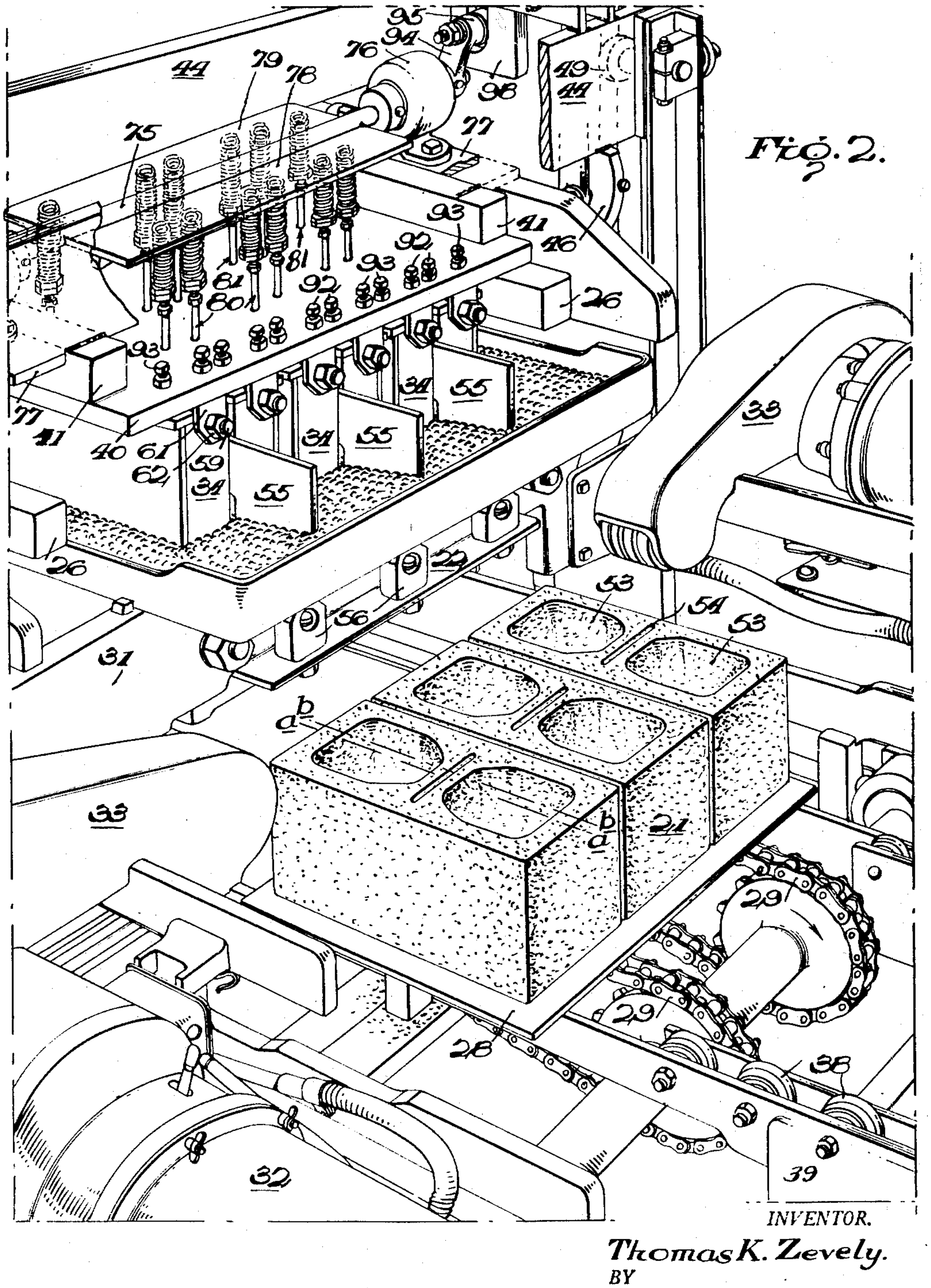
Fig. 2 is another perspective view, on an enlarged scale, of the stripping mechanism and mold box of the machine of Fig. 1 with the elements in the positions occupied just after the finished blocks have been stripped from the mold and showing the stripped blocks on the supporting pallet as they move toward the delivery end of the machine.

Referring first to Figs. 1 and 2, the block molding machine illustrated therein is, except for the stripping mechanism and associated elements, of a well known type for making hollow or cored blocks on plain or imperforate pallets. In this machine, the blocks 21 are formed in a mold box 22 which is stationary except for the movements incident to vibration of the mold during the block forming operations, the moldable material being supplied to the mold box through the open top thereof by a horizontally reciprocable feed pan 23 which is moved forwardly to the position shown in Fig. 1 to fill the mold and rearwardly to receive the next charge of moldable material from the hopper 24, the feed pan being supported by rollers 25 on tracks 26 and receiving its reciprocating movement in the usual manner from the cam 27 which is mounted on one end of a cam shaft extending transversely across the rear of the machine. During the molding operation, the open bottom of the mold box 22 is closed by an imperforate pallet 28, the pallets being fed automatically by the chains 29 from a pallet stack in the rear of the machine to a position below the mold box and then elevated into engagement with the bottom of the mold by vertically reciprocable anvil bars 30, the latter deriving their movement from a cam (not shown) mounted on the opposite end of the shaft which rotates cam 27. When the pallet engages with the bottom of the mold, the mold box is elevated slightly so that the transversely extending mold bars 31 which support the rest of the elements constituting the mold are out of contact with the portions of the machine framework on which they normally rest. The mold box is then ready to receive the charge of moldable material from the feed pan 23 which moves forwardly over the mold box to the position indicated in Fig. 1 and delivers the charge by gravity through the open bottom of the pan. During delivery of the charge, the mold box and superposed feed pan are vibrated in known manner by the motors 32 through the belt drives housed in the casings 33.

When the mold has been filled, the feed pan 23 is moved rearwardly clear of the mold box so as to enable the stripper heads 34, which are normally maintained in the elevated position indicated in Fig. 1, to descend into contact with the upper surface of the material in the mold to first level and compact said material, during which time the mold box is again vibrated and the stripper heads are permitted to gradually sink by gravity as the material is compacted, and to then move downwardly through the mold box and positively eject or strip the molded blocks therefrom as the latter are supported on the pallet 28 which is in turn resting on the anvil bars 30. The stripper heads cease their downward movement when they reach the position shown in Fig. 2, at which time the stripper shoes 35 on the lower ends of the heads project slightly below the bottom of the mold box as indicated in Fig. 10, but the anvil bars 30 continue to descend until the pallet 28 and the blocks 21 supported thereon rest on the pallet chains 29. The chains 29, which are driven from the main drive shaft 36 through a transmission which includes the chain 37, advance the loaded pallet to the position shown in Fig. 1 where the forward portion of the pallet rests on the rollers 38 of the delivery track 39, whence the pallet and blocks may be removed from the machine, either manually or automatically, and transported to the curing vault. As the loaded pallet is thus moved forwardly after the stripping operation, the chains 29 automatically bring another empty pallet into position beneath the mold box, and the anvil bars are again elevated to lift the empty pallet into engagement with the bottom of the mold. Simultaneously with the upward movement of the anvil bars, the stripper heads 34 are moved upwardly out of the mold box and returned to their initial position illustrated in Fig. 1, the movement of the stripper heads being controlled by another cam (not shown) mounted on the same end of the cam shaft as the cam which raises and lowers the anvil bars.

In the block molding machines of the character above described which have heretofore been known to the art, the stripper heads 34 are rigidly secured at their upper ends to, and supported by, a horizontal plate 40 which is in turn secured to a pair of fore-and-aft bars 41 by bolts 42 and nuts 43, the bars 41 being fixed in any suitable manner, as by welding, to the lower edges of a pair of parallel beams 44 which extend from one side of the machine to the other and embrace between their ends vertical guide posts 45 which are fixed to and form part of the machine frame. Just inside the guide posts 45, the beams 44 are connected by stirrup members 46 which provide pivotal connections between the beams and a pair of links 47 forming part of the cam and lever system by which the stripping mechanism is given its vertical movements in timed relation to the movements of the feed pan 23 and anvil bars 30. The upper ends of the links 47 are pivotally connected to the forked ends of levers 48 which are fixed to a shaft (not shown) journalled in the upper portion of the machine frame, said shaft being oscillated in the usual manner by the previously mentioned cam which controls the movements of the stripper heads. As the levers 48 oscillate, the entire stripping mechanism is lowered and raised by the beams 44, the latter being guided in their vertical movement by shoes 49 which slidably engage the front and rear surfaces of guide posts 45.

In this type of block molding machine, the mold cores 51 and kerf plates 52 (see Figs. 4 and 11) which form the cavities 53 and kerfs 54 in the blocks 21 are fixed to and suspended from the lower edges of core bars 55, the latter extending transversely across the top of the mold box 22 and being fixed thereto in proper position by clevises 56 in the usual manner. Due to the presence of the core bars 55 and the arrangement of the elements of the mold in such a manner as to simultaneously produce a single row of blocks having their longer dimensions parallel to the core bars, the stripper heads 34 must be arranged in pairs, the heads of each pair being adapted to pass downwardly on opposite sides of a core bar and to receive the core bar between them during the block compacting and stripping operations. In the conventional machine of this type, the adjacent edges of each pair of stripper heads 34 and attached shoes 35 are spaced apart in permanently fixed relationship by a distance slightly greater than the width of the associated core bar 55, and each stripper shoe 35 is so shaped and dimensioned that, when in engagement with the top of a block in the mold box, it contacts approximately half the area of the block top except for the portion immediately underlying the core bar. Consequently, when molded in a machine of conventional construction, that portion of the upper surface of each block lying between the lines $a—a$ and $b—b$ in Fig. 2 is not contacted at all by the stripper shoes, and hence is not leveled or compacted to the same extent as the rest of the block, and it is in this area that cracks, weakened areas and unsightly surface irregularities develop. It will also be evident that, with a stripping mechanism wherein the stripper heads are rigidly fixed to the supporting plate 40, any vertical misalignment between the heads and the liners 57 and division plates 58 of the mold box (see Figs. 8, 9 and 10) will result in excessive frictional contact and consequent wear as the stripper heads move up and down.

In order to overcome these defects of the prior art molding machines, the present invention replaces the conventional rigid stripper head arrangement with an assembly wherein at least some of the heads are pivotally suspended from the plate 40 for limited movement about horizontal, fore-and-aft axes, the stripper shoes 35 are of increased area and so formed that, when in engagement with the tops of the blocks in the mold box, the adjacent edges of each pair of shoes contact one another in the spaces beneath the core bar which are unoccupied by the cores and kerf plates and the shoes engage substantially the entire area of the top of each block, and means are provided for producing, in timed relation to the vertical movements of the stripping mechanism, pivotal movement of the stripper heads about their axes of suspension so as to separate each pair of shoes sufficiently to enable the core bar to pass therebetween and to then bring the shoes together beneath the core bar.

In the embodiment of the invention illustrated in Figs. 1–11, each of stripper heads 34 is pivotally suspended from the plate 40 by a bolt 59 which extends horizontally in a fore-and-aft direction through a sleeve 60 fixed in the upper end of the head, as by welding to the front and rear walls thereof, the ends of the bolt passing through and being supported in openings in brackets 61 which are welded to and depend from the plate 40 at spaced intervals along the front and rear edges thereof. The bolts 59 are fixed in place in the brackets 61 by nuts 62 and lock washers 63, and preferably do not rotate but merely provide bearings for the sleeves 60 the axes of which are preferably located in the same vertical planes as the centers of gravity of the stripper heads and just below the top plates 64 thereof.

Figures 5, 6, 7:
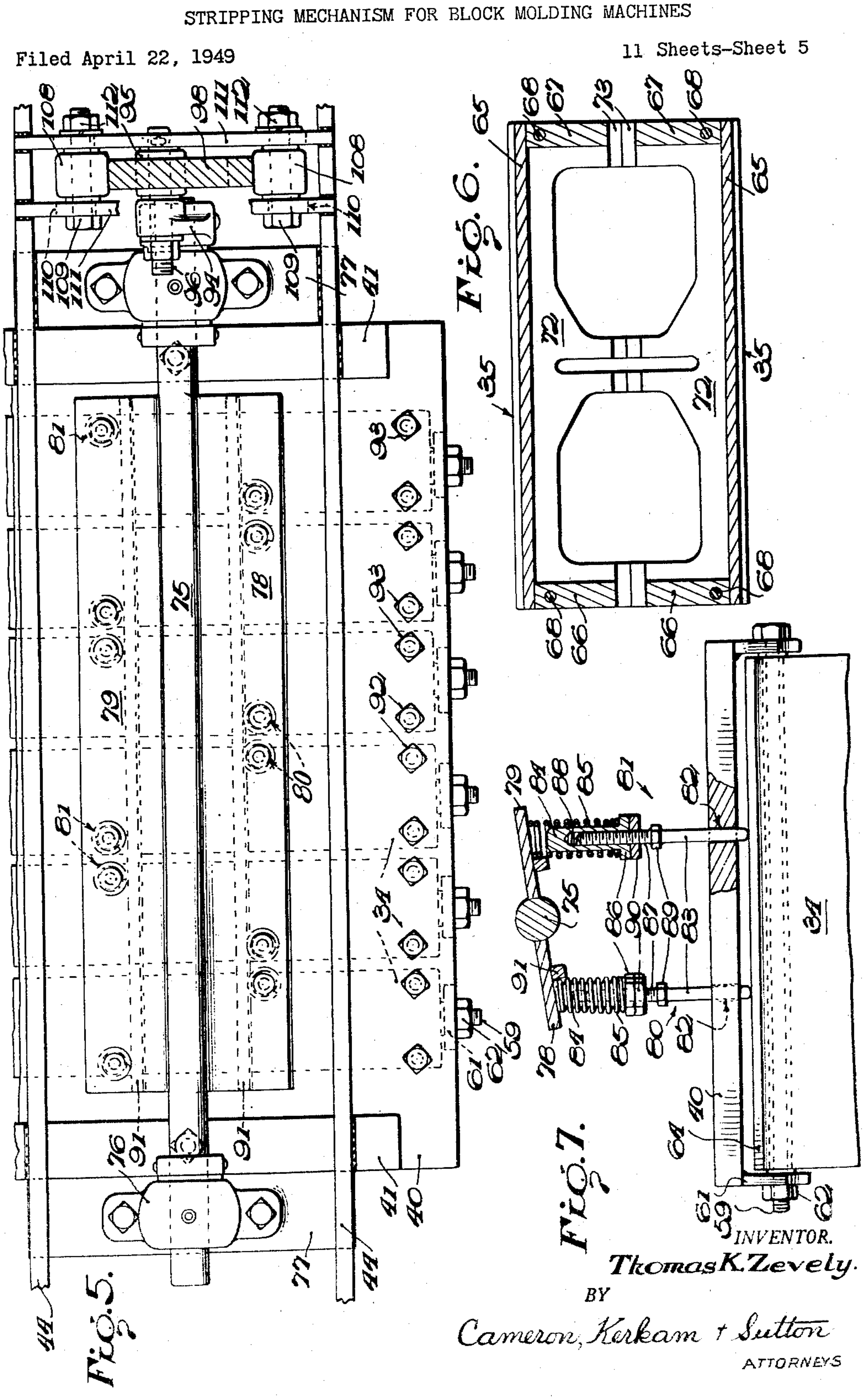
Fig. 6 is a horizontal sectional view, taken substantially on the line 6—6 in Fig. 4, showing the form of the lower ends of the stripper heads and shoes.
Fig. 7 is a side view, partially in section, of the upper end of one of the stripper heads, its associated push rods and the operating mechanism for the rods, this view showing the elements in the positions occupied when the stripper shoes of each pair of heads are separated to pass the core bar.

The body portion of each stripper head is in the form of a hollow shell having one vertical side wall 65 and front and rear end walls 66 and 67, the bottom and the side opposite side wall 65 being open, the body thus having a horizontal cross section substantially in the form of a rectangular C, as indicated in Fig. 6. The stripper shoe 35, which is detachably connected to the bottom of the head by counter-sunk bolts 68 and nuts 69, the side wall 65 and end walls 66 and 67 being cut away as indicated at 70 to enable threading of the nuts 69 on the upper ends of the bolts 68, may consist of a single plate having substantially the same shape and dimensions as one half of the upper surface of the block to be molded, but is preferably formed of two such plates in superposed relation, as is shown best in Fig. 11. As there illustrated, the bottom plate 71 of the shoe has all of its edges vertical, while the upper plate 72 is provided with vertical end edges and one vertical side edge (the continuous side edge which underlies the side wall 65 of the stripper head), but the other side edge (the edge which is cut away to conform to the shape of the cores 51 and kerf plate 52 of the core bar assembly) is beveled upwardly toward the opposite side edge, as indicated at 73, for a purpose hereinafter described.

Each of the stripper shoe plates is thus substantially E-shaped in plan, but it will be noted from Figs. 3, 6, 8, 9 and 10 that those portions of the plates corresponding to the arms of the E are longer than the width of the front and rear end walls 66 and 67 of the body of the stripper head which corresponds to the arms of the C represented by the cross section of said body. The result is that, when the stripper shoes are connected to the heads, the non-continuous or cutaway side edges of the shoes project beyond the vertical planes formed by the free side edges of the end walls 66 and 67 of the stripper heads. The stripper shoe plates are so dimensioned that, when the stripper heads occupy their normal vertical positions, i. e., with their side walls parallel to one another and the adjacent side edges of each pair of heads spaced apart just enough to freely receive the core bar therebetween, the vertical cutaway edges of the bottom plates 71 of each pair of stripper heads are in abutting relation and the upper edges of the beveled portions 73 of the upper plates 72 are closely adjacent, but not covered by, the lower ends of the free side edges of the front and rear end walls 66 and 67.

As a result of forming each of the stripper shoes of the two plates 71 and 72 and detachably connecting the plates to the stripper heads by the bolts 68 and nuts 69, the life of the shoes may be prolonged by virtue of the fact that the bottom plates 71, all of whose edges are vertical, are symmetrically formed with respect to a median horizontal plane therethrough and may therefore be turned over or inverted when wear begins to occur. Another advantage of this construction is that only the bottom plates 71 need be of pack-hardened steel, it being possible to use softer and less expensive material for the upper plates 72 which are not subjected to the same wear as the bottom plates.

As indicated in Figs. 8, 9, 10 and 11, the lower edges of the core bars which overlie the portions of the mold in which the moldable material is received are also beveled as indicated at 74 on the same angle as the beveled portions 73 of the upper shoe plates 72. This construction not only enables the adjacent edges of each pair of stripper shoes to come into abutting engagement as rapidly as possible during downward movement of the stripping mechanism, and thus provides a continuous shoe surface for engagement with the moldable material before the shoes actually come into contact therewith, but also contributes to uniform filling of the mold since the material will flow down the beveled surfaces 74 and distribute itself more evenly than if the lower edges of the core bar were of the usual rectangular shape. The sliding contact between the beveled portions of the shoe plates and the core bars also keeps these surfaces free of adhering aggregate which might adversely affect the molding operation.

Figure 3:
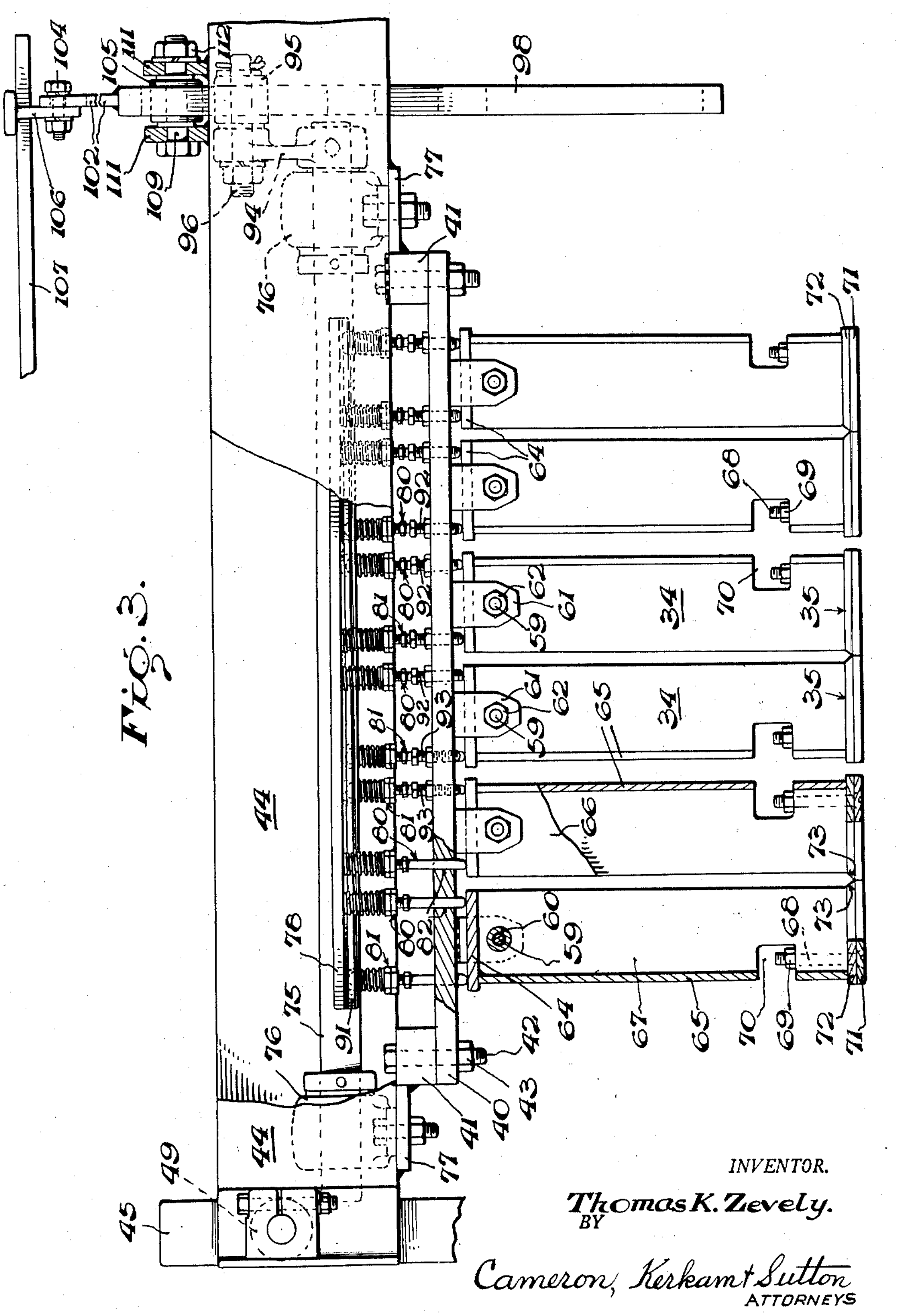
Fig. 3 is a front elevation of the stripping mechanism of Figs. 1 and 2, certain parts being broken away or entirely omitted in order to clearly show the improved structure, while other parts are shown in section to illustrate various structural details.

The mechanism by which the stripper heads are automatically moved about their supporting axes so as to open and close the stripper shoes as the latter pass the core bars is best illustrated in Figs. 3–5 and 7. As indicated in Fig. 3, the stripper heads 34 are suspended from the plate 40 in pairs, the open sides of the heads of each pair facing one another and all heads being in truly vertical position, with the adjacent edges of each pair of shoes 35 in contact with one another, at all times other than during those periods in the cycle of movement of the stripping mechanism when the stripper shoes are passing the core bars. In order to positively separate the lower ends of the stripper heads sufficiently to enable the core bars to pass between the shoes, cam actuated means are provided for automatically imparting oscillatory movement to the heads about the supporting bolts 59 at the proper points in the stripping cycle. Although return of the stripper heads to their normal positions after separation of the shoes might be effected by gravity, assisted, if desired, by spring pressure, it is preferable to provide positively acting means for bringing the stripper shoes back together again after they have passed the core bars.

In both embodiments of the invention illustrated, the means for moving the pivotally supported stripper heads about their pivotal axes comprise two sets of push rods engaging the upper surfaces of the heads so disposed with respect to said axes that depression of one set of rods separates the shoes while depression of the other set returns the shoes to abutting relation, and a cam actuated, oscillatory butterfly plate arrangement which alternately depresses the two sets of push rods.

As shown in Figs. 3–5, and 7, an operating shaft 75 extends transversely of the stripping mechanism above the plate 40 parallel to and between the beams 44, said shaft being journalled adjacent both ends in bearings 76 which are fixed to and supported by plates 77 suitably secured to the beams 44, as by welding. Fixed to and projecting radially outwardly from shaft 75 are a pair of diametrically opposite butterfly plates 78 and 79 which extend axially along the shaft for a distance approximately equal to the overall length of the stripper head assembly as viewed in Fig. 3, and each of which plates has a radial dimension relative to the shaft 75 of between one-fourth and one-sixth of the fore-and-aft dimension of the stripper heads. The plates 78 and 79 may be welded to the shaft 75 or otherwise secured thereto in any suitable manner so as to oscillate therewith through relatively small arcs above and below the horizontal.

Disposed beneath the butterfly plates 78 and 79 are two sets of push rods, indicated generally at 80 and 81, the rods 80 being aligned in one set beneath the outer edge portion of plate 78 while the rods 81 of the other set are similarly located underneath the plate 79. These push rods are adapted to transmit downward thrust from the butterfly plates to the tops of the stripper heads, for which purpose they pass through vertical guide bores 82 in the stripper head supporting plate 40 and engage the top plates 64 of the heads at points which are laterally offset from the vertical planes of the pivot-forming bolts 59, each push rod 80 of the first set engaging the top plate of its associated stripper head adjacent the edge thereof which overlies the open side of the head, while the rods 81 of the other set lie in substantially the same vertical planes as the side walls 65 of the stripper heads. With this arrangement, it is evident that depression of push rods 80 by butterfly plate 78 will so rotate the stripper heads about the bolts 59 as to laterally separate the stripper shoes 35 of each pair of heads, while depression of rods 81 by plate 79 will move the heads in the opposite directions and bring the shoes back into contact with one another.

Although the push rods 80 and 81 may take the form of solid rods in direct contact at their upper and lower ends with the butterfly plates and the top plates of the stripper heads, respectively, certain advantages of adjustment are attained by the composite push rod and spring assembly best illustrated in Fig. 7. As there shown, each of push rods 80 and 81 is constructed in the same manner, and consists essentially of a lower section 83 and an upper section 84 which are in threaded engagement with one another, and a compression spring 85 which is adapted to have a relatively close fit around the upper section 84 and to rest at its bottom end on a collar 86 formed integrally with said upper section at the lower end thereof. The lower section 83 is of cylindrical form for a little over half its length upwardly from the bottom end, the top portion being externally threaded as indicated at 87 so as to engage the internally threaded bore 88 of the upper section 84. With this construction, the overall length of the push rod, and particularly the effective length of the lower section thereof, can be readily adjusted by threading the lower section into or out of the upper section, the lower section being provided with a suitable non-round collar 89 at the base of the threaded portion 87 to which a wrench can be fitted in order to make the adjustment after the stripping mechanism has been assembled, and with a lock nut 90 for fixing the parts in adjusted position. Such adjustments are useful both when initially installing the mechanism and when the lower ends of the push rods become worn.

When the mechanism is assembled, the cylindrical portions of lower sections 83 of the push rods pass through and are maintained in vertical position by the guide bores 82 in plate 40 with the bottoms of the rods resting on the upper surfaces of top plates 64 of the stripper heads, while the upper ends of the springs 85 engage the lower surfaces of butterfly plates 78 and 79. If desired, the butterfly plates may be provided with downwardly projecting ribs 91 just inboard of the springs 85 so as to assist in maintaining the push rod assemblies in proper vertical position and prevent any tendency of the upper ends of the springs to slide toward the operating shaft 75 as the butterfly plates oscillate. The springs 85 are longer in their relaxed state than the portions of the upper push rod sections 84 which they surround, and are always under compression in the assembled mechanism so as to continually transmit downward thrust to the push rods with an equivalent reaction pressure upward against the butterfly plates which effectively eliminates lost motion and chattering.

The push rods are preferably so adjusted that, when the butterfly plates are horizontal (in which position the stripper heads occupy positions intermediate those in which the shoes are closed and fully open), both plates are in direct metal-to-metal contact with the tops of both sets of push rods. When so adjusted, it will be evident that, when the stripper heads are at rest with the shoes either closed or fully open, one of the butterfly plates is in direct contact with the tops of its associated set of push rods, while the other plate is elevated above the tops of the other rods but still maintains the latter in firm contact with the tops of the stripper heads through the pressure of the springs. For example, in Fig. 4 the butterfly plate 79 contacts the tops of push rods 81 and has depressed the latter so as to move the stripper heads to the shoe closed position shown in Fig. 3, while the plate 78 is raised above the tops of rods 80. Fig. 7 illustrates the positions occupied by the parts when, as a result of oscillation of the shaft 75, the stripper heads have been rotated about their pivotal axes so as to separate the shoes, under which conditions the plate 78 has moved into direct engagement with the top of rods 80 and has depressed the latter to swing the stripper heads apart while the plate 79 has raised above the tops of the rods 81.

In order to prevent movement of the stripper heads beyond the limits represented by the vertical, shoe closed position illustrated in Figs. 3, 9 and 10 and the tilted, shoe open position of Fig. 8, two groups of set screws 92 and 93 are provided which form positive stops for the heads when they reach the two extremes of their desired movement. As shown best in Figs. 4 and 5, these set screws are threaded through the head supporting plate 40 adjacent the forward edge thereof and are so adjusted that their lower ends will abut the top plates 64 of the stripper heads when the latter reach the desired limits of movement, the set screws 92 lying in substantially the same fore-and-aft vertical planes as the push rods 80 and stopping the heads when they reach their normal vertical, shoe closed positions, while the second group of screws 93 are in substantial fore-and-aft alignment with push rods 81 and limit movement of the heads in shoe opening direction so as to avoid collision between the oppositely moving heads of adjacent pairs.

Figure 4:
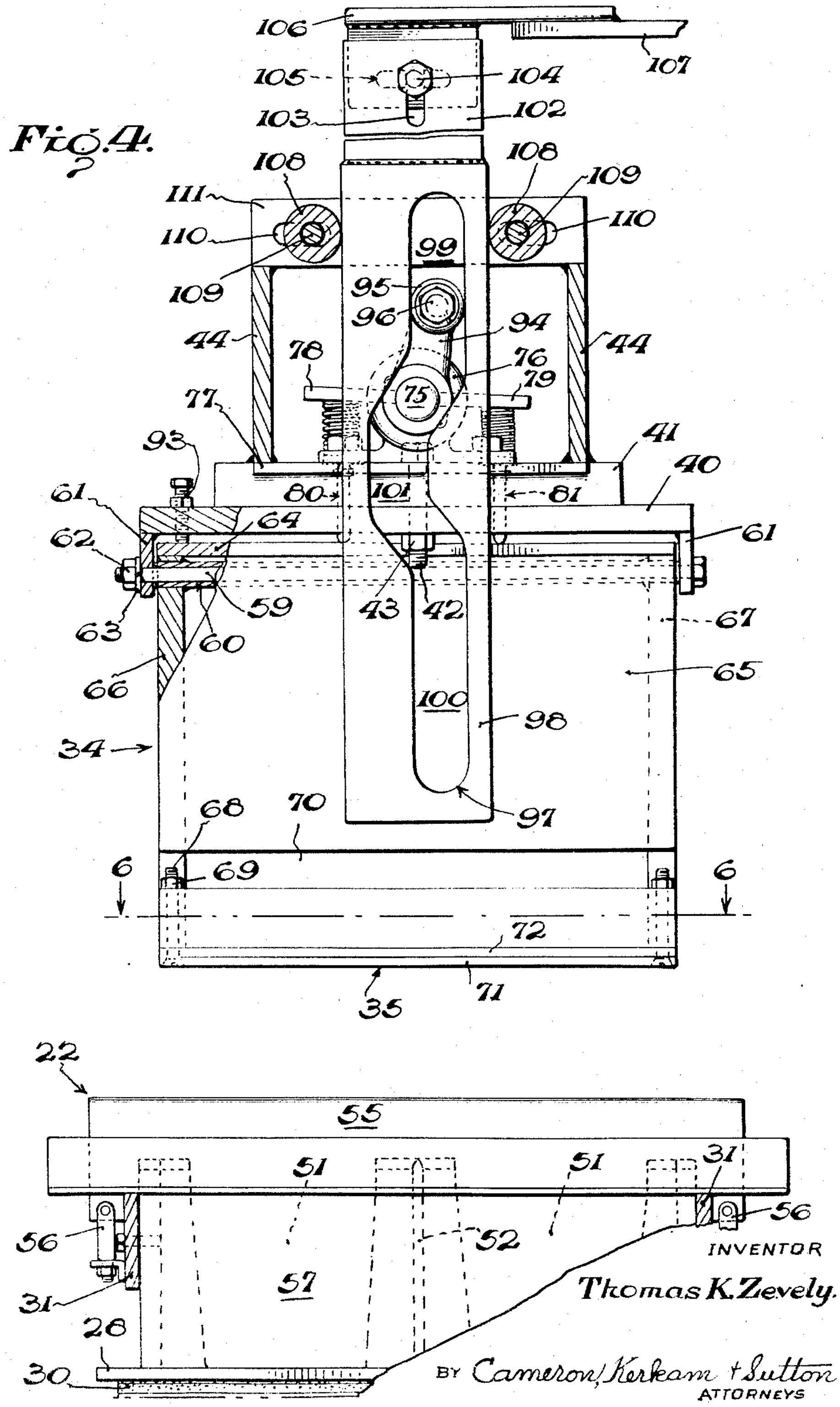
Figs. 4 and 5 are side elevation and plan views, respectively, of the mechanism shown in Fig. 3, certain parts being shown in section and Fig. 4 including a side elevation of the mold box.

Referring now to the means by which the operating shaft 75 and butterfly plates 78 and 79 are oscillated so as to open and close the stripper head shoes at the proper times in the cycle of operation of the block molding machine, it will be seen from Figs. 3, 4 and 5 that the shaft 75 has fixed thereto at one end a crank arm 94 which carries at its outer end a cam roller 95, the latter being rotatably mounted relatively to the crank arm in any suitable manner, as on a stud bolt 96. The cam roller 95 extends into a closed cam groove or track 97 formed in an elongated vertical cam plate 98 which is so fixed to the machine frame that, as the stripping mechanism is moved upwardly and downwardly in the manner previously described, the roller 95 travels in the stationary groove 97 and thereby oscillates the shaft 75 and the attached butterfly plates in accordance with the lateral movements of the cam roller produced by the shape of the cam groove. As shown in Fig. 4, the groove 97 consists of an upper straight vertical section 99, a lower straight section 100 vertically aligned with the upper section, and an intermediate offset section 101 which is itself vertical in the central portion thereof but is connected to the upper and lower sections 99 and 100 by oppositely inclined portions. The crank arm 94 is fixed to the shaft 75 in such position that, when the cam roller 95 is in the upper and lower sections 99 and 100 of the cam groove, the butterfly plates and push rods occupy the positions indicated in Fig. 4 and the stripper heads are positively maintained in the vertical, shoe closed position illustrated in Figs. 3, 9 and 10. When, however, the cam roller 95 is travelling either upwardly or downwardly in the offset section 101 of the cam groove, the shaft 75 is oscillated so as to turn the butterfly plates to the position shown in Fig. 7 and, by depressing push rods 80, separate the stripper shoes sufficiently to pass the core bars. It will be understood that the offset section of the cam groove is so designed, in conjunction with the lever ratios resulting from the relative location of the push rods with respect to both the axis of shaft 75 and the pivotal axes of the stripper heads, as to impart the proper throw to the crank arm 94 to produce the desired amount of separation of the stripper shoes as they approach and pass the core bars.

Although it is not essential that the upper section 99 of the cam groove be vertically aligned with the lower section 100, so that the stripper shoes are closed when the shoes are above the core bars as well as when they are in contact with the moldable material in the mold box, it is preferred to shape the cam groove in the manner illustrated because reclosing of the shoes during upward movement of the heads after withdrawal from the mold box dislodges any aggregate which may be carried out of the mold on the stripper heads just above the shoes 35. If not removed immediately, such material tends to harden and build up deposits on the shoes and side walls of the stripper heads which, during subsequent downward movements of the stripping mechanism, may prevent the shoes from opening sufficiently to receive the core bars therebetween.

Mounting of the cam plate 98 on the machine frame may be accomplished simply and conveniently in the manner illustrated in Figs. 1, 3 and 4. As shown, a hanger plate 102 is welded or otherwise fixed to the upper edge of cam plate 98 and is provided with a vertically elongated slot 103 adapted to receive a bolt 104 which also passes through a horizontally elongated slot 105 formed in the vertical web of a suspension bracket 106, the latter being suitably fixed to the cap plate 107 at the top of the machine frame. The suspension bracket 106 is so positioned on the cap plate 107 that the cam plate 98 is suspended between the transversely extending beams 44 of the stripping mechanism in the space between one of the stirrup members 46 and the adjacent end of head supporting plate 48. The horizontal slot 105 in suspension bracket 106 enables proper adjustment of the position of the cam plate laterally, while the vertical slot 103 in the hanger plate 102 permits the vertical adjustment necessary to insure that the cam roller 95 enters the offset section 101 of the cam groove at the proper times during vertical movement of the stripping mechanism to open and close the stripper shoes immediately above and below the core bars.

In order to assist in maintaining the cam plate 98 in a fixed vertical position once it has been properly adjusted, a pair of guide rollers 108 may be suitably mounted on the beams 44 of the stripping mechanism so as to move upwardly and downwardly therewith in contact with the edges of the cam plate. In the construction illustrated, each guide roller 108 is rotatably mounted on the central portion of a bolt 109 the ends of which project horizontally through elongated slots 110 formed in a pair of parallel plates 111, the latter extending transversely between beams 44 on opposite sides of cam plate 98 and being suitably fixed, as by welding, to the upper edges of said beams. When the cam plate has been adjusted to its proper position, the guide rollers 108 are moved inwardly by virtue of the adjustability provided by the slots 110 until they contact the edges of the cam plate, whereupon tightening of the nuts 112 on bolts 109 will fix the axes of the rollers so that they will continually embrace the cam plate between them as the stripping mechanism moves upwardly and downwardly and thereby insure retention of said plate in a vertical position.

The method of operation of the improved stripping mechanism disclosed in Figs. 1–11 should be obvious from the foregoing description of the structure, particularly when reference is had to Figs. 8, 8*a*, 9, 9*a*, 10 and 10*a* which indicate the relative positions of the stripper heads and mold box and of the cam roller and groove as the stripper heads descend toward and into the mold box during the block forming and stripping operations. During downward movement of the stripping mechanism from its normal elevated position shown in Fig. 1, the stripper heads remain in vertical, shoe closed position until the shoes approach the level of the tops of the core bars. During this time, the cam roller 95 moves downwardly in the upper section 99 of the cam groove and maintains the operating shaft 75 and butterfly plates 78 and 79 in the positions indicated in Fig. 4 so as to depress the push rods 81 and thereby apply forces to the top plates 64 of the stripper heads adjacent the outer edges thereof, i. e., the edges overlying side walls 65, which maintain the heads in vertical position with the cutaway edges of each pair of stripper shoes 35 in contact with one another. Just before the stripper shoes descend to the plane of the tops of the core bars 55, the cam roller 95 enters the offset section 101 of the cam groove and oscillates shaft 75 so as to turn the butterfly plates through a relatively small angle to the position shown in Fig. 7, wherein the plates are tilted relatively to the horizontal in the opposite direction to that indicated in Fig. 4 and the push rods 80 are depressed so as to move the stripper heads about their pivotal suspension axes in such directions and amounts as will separate the stripper shoes sufficiently to permit them to pass downwardly around the core bars in the matter indicated in Fig. 8.

The offset section 101 of the cam groove is so designed that, as the stripper shoes approach the level of the beveled portions 74 of the core bars, the cam roller 95 is moved back toward its original position so as to again oscillate the shaft 75 and, through the cooperation of the butterfly plates and push rods, swing the stripper heads back toward the vertical; and when the roller reaches the point illustrated in Fig. 9*a*, at the lower end of the offset section of the cam groove, the stripper shoes are brought back together again with the beveled edges 73 of the upper shoe plates 72 sliding downwardly along the similarly beveled portions 74 of the core bars. At this time, the bottoms of each pair of stripper shoes present a substantially continuous surface for contact with the upper surface of the moldable material forming one of the blocks in the mold box, so that when the stripper heads momentarily come to rest on top of the material, and the mold box is vibrated to compact the blocks, the stripper shoes engage substantially the entire area of the top of each block and are thereby capable of exerting a uniform leveling and compacting action. During this period, the cam roller is in the upper end of the lower section 100 of the cam groove.

After the block forming operation is completed, the stripping mechanism resumes its downward movement and strips the finished blocks from the mold box simultaneously with downward movement of the anvil bars 30 and block supporting pallet 28. During this stripping operation, the cam roller moves downwardly in the lower section 100 of the cam groove until it reaches the position shown in Fig. 10a when the stripper heads come to rest in their lowermost position indicated in Fig. 10, in which position they remain until the next empty pallet is advanced by the chains 29 to a position beneath the mold box and is then moved upwardly by the anvil bars 30. As the anvil bars rise, the stripping mechanism is also elevated to withdraw the stripper heads from the mold box and return them to the initial position of Fig. 1. During the upward movement of the stripping mechanism, the cam roller reverses its travel in the cam groove so as to separate the stripper shoes as they approach the bottom edges of the core bars and then bring them back together again after they pass above the upper edges of said bars, all of the operations of the stripper head operating mechanism being merely the reverse of those which occur during downward movement of the stripper heads.

It will be evident that, should any stripper head become vertically misaligned with a liner 57 or division plate 58 of the mold box 22, the pivotal mounting of the head will enable whatever slight adjustment may be necessary to bring that head into proper alignment without transmitting any transverse stresses to the rest of the stripper mechanism which would tend to throw other stripper heads out of alignment.

Referring now to Figs. 12–15, the second form of stripping mechanism embodying the invention illustrated herein is particularly adapted for use when the machine is molding blocks of the type shown in Fig. 15; that is, when the cores and division plates of the mold box are so arranged as to produce four blocks 113 simultaneously on a single pallet, the blocks being arranged in two rows with their longer dimensions parallel to the front of the machine, as distinguished from the parallel fore-and-aft arrangement of the blocks produced by the mechanism of Figs. 1–11. As shown, each of the blocks 113 contains two openings or cavities 114, but is unkerfed, the mold cores 115 which form the two openings in each block being connected to different core bars 116 so that, as in the previously described embodiment, the core bars traverse the mold box 22 in a fore-and-aft direction. There are four core bars 116 in the present embodiment, instead of three as in the arrangement of Figs. 1–11, and only one fore-and-aft division plate 58 is used, instead of two. The formation of two rows of blocks, however, necessitates the addition of a pair of transversely extending division plates 117, one on each side of the fore-and-aft plate 58.

It will be understood that, except for the specifically different arrangement of the mold box and the modified form of stripper head assembly, the machine represented by Figs. 12–15 is of the same construction and mode of operation as that previously described; and since the stripping mechanism of the second embodiment is of substantially the same construction as that of Figs. 1–11 aside from the particular form and arrangement of the stripper heads and shoes, Figs. 12, 13 and 14 omit much of the apparatus which is common to the two devices.

The principal difference between the two stripper head arrangements is that the heads of Figs. 1–11 are arranged in pairs, two to each block, and all are pivotally supported from the plate 40, whereas in Figs. 12–14, the heads are divided into two groups, each group having one fixed head and a pair of movable heads on opposite sides thereof; the heads of each group cooperating to form a pair of blocks arranged one behind the other on the pallet 28. As shown in Fig. 12, there are four movable stripper heads 118 of like construction arranged in pairs on opposite sides of the vertical plane of the fore-and-aft division plate 58 of the mold box 22, the heads of each pair being separated by and cooperating with a symmetrically formed fixed stripper head 119. Each of the heads, movable and fixed, is in the nature of a twin head, being symmetrical with respect to the vertical plane of the transverse division plates 117, as indicated in Figs. 13 and 14.

Each of the movable stripper heads 118 comprises a vertically extending front end wall 120, a corresponding rear end wall 121, a side wall 122, a pair of parallel, horizontal extending bars 123 and 124 welded or otherwise fixed to the front and rear end walls 120 and 121, and a pair of vertical interior walls 125 and 126 parallel to the front and rear end walls and fixed at their upper ends to the lower edges of bars 123 and 124. Detachably connected to the lower ends of the end walls 120, 121 and interior walls 125, 126 by countersunk bolts 127 and nuts 128 are a pair of stripper shoes 129 and 130, the end and interior walls and the side wall being cut away as indicated at 131 to enable application of the nuts 128 to the upper ends of the bolts 127 so as to fix the stripper shoes to the head. Each of the stripper shoes 129 and 130 is preferably formed of two superposed plates 132 and 133, and the free ends of the arms of each upper plate 132 are beveled as shown at 134 for cooperation with the similarly beveled portions 135 of the core bars 116, for the same purposes as those previously mentioned in connection with the embodiment of Figs. 1–11. As illustrated best in Fig. 14, each of stripper shoes 129, 130 is substantially C-shaped in plan and is adapted to contact the end portion of the upper surface of one of the blocks 113. The adjacent arms of the shoes 129 and 130 are spaced apart, as shown in Fig. 13, by a distance approximately equal to the width of the transverse division plates 117, while the side wall 122 of the stripper head is cut out as indicated at 136 for a substantial portion of its height so as to receive one of the division plates 117 during the stripping operation.

Each of the movable stripper heads 118 is pivotally suspended from the plate 40 by a bolt 137, the ends of which pass through suitable openings in the front and rear end walls 120 and 121 of the stripper head adjacent the upper ends of said walls and the central portion of which is journaled in a sleeve 138 welded or otherwise fixed to the bottom surface of plate 40. As shown in Figs. 12 and 13, the end walls 120, 121 of the stripper head extend upwardly above the upper edges of the side wall 122 and bars 123, 124 embrace the front and rear edges of the plate 40, washers 139 being provided between the ends of the sleeve 138 and the inner faces of the end walls 120, 121 so as to prevent frictional contact between the latter and the edges of plate 40. The bolt 137 is preferably fixed in non-rotatable relation to the end walls of the stripper head by a nut 140 and lock washer 141 so that, when the head is moved about its axis of suspension, the bolt turns with the head in the sleeve 138.

Each of the fixed stripper heads 119 consists essentially of a vertical plate 142 the upper edge of which is fixed, as by welding, to the bottom of the head supporting plate 40 and the lower end of which lies in the same horizontal plane with the lower ends of the end and interior walls of the movable stripper heads and carries a pair of removable stripper shoes 143 and 144. Each of the shoes 143, 144 is substantially I-shaped in plan and is adapted to be detachably secured to the plate 142 by countersunk bolts 145 and nuts 146 with the portion corresponding to the central stem of the I substantially coplanar with the plate 142 and the transversely extending arms projecting on opposite sides of said plate so as to cooperate with the inwardly extending arms of the shoes 129 and 130 of the movable stripper heads. In order to strengthen the connection between the stripper shoes 143, 144 and the plate 142, the latter may be provided with enlarged flange portions 147 and 148 through which the bolts 145 pass, and with transversely extending steady plates 149 and 150 which are welded or otherwise fixed to the outer faces of the flanged portions 147, 148 and are of substantially the same length as the cross arms of the stripper shoes so as to abut the upper surfaces of the latter when the shoes are fixed to the head and thereby prevent any tendency of the shoes to rock about the lower edge of the head plate 142. The front and rear edges of the plate 142 may be recessed, if necessary, for a suitable distance above the outer flanged portions 147, as indicated at 151, to facilitate connection of the nuts 146 to the bolts 145, while the central portion of said plate is cut out to the same height as the cut-out portions 136 of the side walls 122 of the movable stripper heads, as indicated at 152 in Fig. 13, so as to receive the transverse division plate 117 and also provide access to the upper ends of the bolts 145 which pass through the inner flanged portions 148.

As in the case of the stripper shoes of the movable stripper heads, the shoes 143, 144 of each fixed head 119 are also preferably formed of superposed plates 153 and 154. Inasmuch as the stripper shoes of the fixed heads have no lateral movement relatively to the core bars, the edges of the upper plates 153 of said shoes may be left vertical, instead of being beveled, as indicated in Fig. 12.

The sleeves 138 in which the movable stripper head bolts 127 are journalled are fixed to the plate 40 in such positions that, when the movable heads 118 are installed, they occupy the positions illustrated in Fig. 12, the heads of each pair lying on opposite sides of one of the fixed heads 119 with their open sides facing the latter, and the side walls 122 of the two inboard movable heads being adjacent one another and separated by a space slightly greater than the width of the fore-and-aft division plate 58 of the mold box 22 so as to receive said plate between them when the stripper heads are moved downwardly into the mold box. Except for the periods during the vertical movement of the stripping mechanism when the stripper shoes are passing the core bars 116, the movable heads 118 are suspended in truly vertical position with the free edges of the arms of the bottom stripper shoe plates 133 in abutting relation with the adjacent edges of the arms of the bottom shoe plates 154 of the fixed heads 119 and the vertical edges of the end walls 120, 121 and interior walls 125, 126 laterally spaced from the adjacent vertical edges of the steady plates 149, 150 by a distance slightly greater than the width of the core bars 116.

In order to separate the stripper shoes at the proper points in the cycle so as to pass the core bars, the movable stripper heads 118 are oscillated about the axes of their supporting bolts 137 by the same cam actuated mechanism as that previously described in connection with the machine of Figs. 1–11, including an operating shaft 75, butterfly plates 78 and 79 and push rods 80 and 81, the only substantial difference being that, in the construction of Figs. 12–14, the lower ends of the push rods 80 and 81 rest on the upper surfaces of horizontal bars 124 and 123, respectively, instead of on stripper head top plates as in the first embodiment. As indicated in Fig. 12, the movable heads 118 do not include top plates, but are open at the top between the bars 123 and 124 so that the sleeves 138 may be received therebetween. Another difference between the two stripper head assemblies illustrated is that only one set of set screws 93 need be provided in the structure of Figs. 12–14, these screws being adapted to engage the upper surfaces of bars 123 when the heads are moved to separate the stripper shoes and thereby limit the shoe opening movement of the heads as desired. Since the stripper heads 119 and their shoes 143, 144 are rigidly fixed to the plate 40, the bottom plates 154 of said shoes themselves serve as stops for the movable heads when the latter are returned to their normal shoe closed positions, thereby avoiding the necessity for a second set of set screws like those shown at 92 in Figs. 2, 3 and 5.

Inasmuch as the method of operation of the mechanism of Figs. 12–14 is substantially the same as that of Figs. 1–11, except for the immobility of the fixed stripper heads 119, further description thereof should be unnecessary.

The advantages of the novel stripping mechanisms of the present invention in comparison with those heretofore embodied in block molding machines of the same general type will be apparent to those skilled in the art from the foregoing description of the particular devices illustrated. It will be evident, however, that the invention is not limited to the specific structures shown in the accompanying drawings, but is capable of a variety of mechanical embodiments. For example, it should be obvious that the movable stripper heads can be supported and given their desired movements by various means other than those which have been described and illustrated, and that, if desired, said heads may be given bodily lateral movements instead of the pivotal movements herein disclosed. It is also contemplated that, instead of moving the entire stripper head, the shoe opening and closing operation may be performed by moving only the lower or shoe portions of the heads, in which event the core bars themselves may serve as one element of the cam-and-follower mechanism for producing the desired movement. It is likewise clear that the invention is not restricted to molding mechines in which the stripping mechanism moves while the mold box remains relatively stationary, but is readily adaptable to those machines wherein the mold box is the movable element.

Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. In a machine for molding cored building blocks, the combination of a mold box open at top and bottom and including at least one core bar extending across the top thereof and supporting at least one core within the box, means for positioning a pallet below said mold box to close the bottom thereof, means for supplying moldable material to the space within said mold box surrounding said core, stripping means normally positioned above the mold box for engaging the upper surface of the material therein to smooth and compact said material during formation of the block and to thereafter remove the block from said box, means for producing relative movement between said mold box and stripping means in a vertical direction to bring the stripping means into engagement with the moldable material in the box, eject the block from the box and then return the stripping means and box to their normally separated positions, said stripping means including stripper heads adapted to pass on opposite sides of said core bar and to receive the core bar between them during said relative vertical movement of the mold box and stripping means, means for supporting at least one of said stripper heads for lateral movement relatively to the other to vary the distance therebetween, and means operable in timed relation to said relative vertical movement of the mold box and stripping means for producing said lateral movement.

2. In a machine for molding cored building blocks, the combination of a mold box open at top and bottom and including at least one core bar extending across the top thereof and supporting at least one core within the box, means for positioning a pallet below said mold box to close the bottom thereof, means for supplying moldable material to the space within said mold box surrounding said core, stripping means normally positioned above the mold box for engaging the upper surface of the material therein to smooth and compact said material during formation of the block and to thereafter remove the block from said box, means for producing relative movement between said mold box and stripping means in a vertical direction to bring the stripping means into engagement with the moldable material in the box, eject the block from the box and then return the stripping means and box to their normally separated positions, said stripping means including stripper heads adapted to pass on opposite sides of said core bar during said relative vertical movement of the mold box and stripping means, the adjacent sides of said stripper heads being vertical and separated by a space sufficient to receive the core bar during the time that the heads are within the mold box, stripper shoes at the lower ends of said heads having their adjacent sides in contact with one another when the sides of said heads are in vertical position, means for supporting at least one of said heads for lateral movement toward and away from the other to vary the amount of separation therebetween and to move the stripper shoes into and out of contact with one another, and means operable in timed relation to said relative vertical movement of the mold box and stripping means for producing said lateral movement.

3. In a machine for molding cored building blocks, the combination of a stationary mold box open at top and bottom and including at least one core bar extending across the top thereof and supporting at least one core within the box, means for positioning a pallet below said mold box to close the bottom thereof, means for supplying moldable material to the space within said mold box surrounding said core, stripping means normally positioned above the mold box for engaging the upper surface of the material therein to smooth and compact said material during formation of the block and to thereafter remove the block from said box, means for moving said stripping means in a vertical direction to bring said means into engagement with the moldable material in the box, eject the block from the box and then return the stripping means to its normal position above the box, said stripping means including stripper heads adapted to pass on opposite sides of said core bar and to receive the core bar between them during vertical movement of said stripping means, means for supporting at least one of said stripper heads for movement laterally with respect to the other to vary the distance therebetween, and cam actuated means operable in timed relation to the vertical movement of said stripping means for producing said lateral movement.

4. A block molding machine according to claim 3 wherein said cam actuated means includes a stationary cam element positioned adjacent the path of movement of said stripping means, a cooperating cam element movable with the stripper head supporting means, and means also movable with said supporting means and actuated by said last named cam element for producing said lateral movement.

5. A block molding machine according to claim 3 wherein both stripper heads are suspended from said supporting means for pivotal movement about horizontal axes and are provided at their lower ends with stripper shoes having their adjacent edges in contact with one another when said shoes are in engagement with the upper surface of the moldable material, and wherein said cam actuated means includes a shaft carried by said supporting means above the upper surfaces of said stripper heads and extending transversely to the pivotal axes thereof, push rods engaging the upper surfaces of said stripper heads at points between the vertical planes of said pivotal axes, and means operable upon rotation of said shaft for depressing said push rods and thereby moving said stripper heads about their pivotal axes so as to positively separate the adjacent edges of said stripper shoes.

6. A block molding machine according to claim 3 wherein both stripper heads are suspended from said supporting means for pivotal movement about horizontal axes and are provided at their lower ends with stripper shoes having their adjacent edges in contact with one another when said shoes are in engagement with the upper surface of the moldable material, and wherein said cam actuated means includes a shaft carried by said supporting means above the upper surfaces of said stripper heads and extending transversely to the pivotal axes thereof, one set of push rods engaging the upper surfaces of said stripper heads between the vertical planes of said pivotal axes, a second set of similar push rods positioned at the opposite sides of said vertical planes, and means operable upon rotation of said shaft for depressing said first and second sets of push rods alternately and thereby moving said stripper heads about their pivotal axes so as to positively separate and bring back together the adjacent edges of said stripper shoes.

7. In a block molding machine of the type including a mold box containing cores supported by core bars extending across the top of the mold box, stripper mechanism for engaging the tops of the molded blocks and means for producing relative movement of the mold box and stripper mechanism in a vertical direction to remove the blocks from the box, an improved stripper mechanism comprising a plurality of stripper heads equal in number to twice the number of block-forming molds in the mold box, said stripper heads being arranged in pairs with the heads of each pair laterally separated by a space sufficient to receive a core bar, means for supporting each pair of said stripper heads for limited lateral movement toward and away from one another, the lower ends of said stripper heads being so shaped and dimensioned that, when in engagement with the tops of the blocks in the mold, the adjacent edges of the lower ends of each pair of heads contact one another in the spaces beneath the core bar which are unoccupied by the cores and said ends engage substantially the entire area of the top of each block, and means for producing lateral movement of said stripper heads during the relative vertical movement of the mold box and stripper mechanism to first separate the lower ends of each pair of heads sufficiently to enable the core bar to pass therebetween and to then bring the same together beneath the core bar.

8. In a block molding machine of the type including a mold box containing cores supported by core bars extending across the top of the mold box, stripper mechanism for engaging the tops of the molded blocks and means for producing relative movement of the mold box and stripper mechanism in a vertical direction to remove the blocks from the box, an improved stripper mechanism comprising a plurality of stripper heads equal in number to twice the number of block-forming molds in the mold box, said stripper heads being arranged in pairs with the heads of each pair laterally separated by a space sufficient to receive a core bar, means for supporting each pair of said stripper heads for limited lateral movement toward and away from one another, stripper shoes on the lower ends of said stripper heads so shaped and dimensioned that, when in engagement with the tops of the blocks in the mold, the adjacent edges of each pair of shoes contact one another in the spaces beneath the core bar which are unoccupied by the cores and the shoes engage substantially the entire area of the top of each block, and means for producing lateral movement of said stripper heads during the relative vertical movement of the mold box and stripper mechanism to first separate each pair of stripper shoes sufficiently to enable the core bar to pass therebetween and to then bring said shoes together beneath the core bar.

9. In a block molding machine of the type including a mold box containing cores supported by core bars extending across the top of the mold box, stripper mechanism for engaging the tops of the molded blocks and means for producing relative movement of the mold box and stripper mechanism in a vertical direction to remove the blocks from the box, an improved stripper mechanism comprising a stripper head supporting member, a stripper head rigidly fixed at its upper end to said supporting member, a pair of movable stripper heads suspended from said supporting member on opposite sides of said fixed head, each of said movable heads being laterally separated from said fixed head by a space sufficient to receive a core bar, the lower ends of said stripper heads being so shaped and dimensioned that, when in engagement with the tops of the blocks in the mold, the adjacent edges of the lower ends of said heads contact one another in the spaces beneath the core bars which are unoccupied by the cores and said ends engage substantially the entire area of the top of each block, and means for moving said movable stripper heads during the relative vertical movement of the mold box and stripper mechanism to first separate the lower ends of said heads sufficiently to enable the core bars to pass therebetween and to then bring the same together beneath the core bars.

10. In a block molding machine of the type including a mold box containing cores supported by core bars extending across the top of the mold box, stripper mechanism for engaging the tops of the molded blocks and means for producing relative movement of the mold box and stripper mechanism in a vertical direction to remove the blocks from the box, an improved stripper mechanism comprising a plurality of stripper heads so arranged that adjacent heads are laterally separated by spaces sufficient to receive the core bars, stripper shoes on the lower ends of said stripper heads so shaped and dimensioned that, when in engagement with the tops of the blocks in the mold box, the adjacent edges of said shoes contact one another in the spaces beneath the core bars which are unoccupied by the cores and the shoes engage substantially the entire area of the top of each block, and means for producing relative lateral movement of said stripper shoes during the relative vertical movement of the mold box and stripper mechanism to first separate the shoes sufficiently to enable the core bars to pass therebetween and to then bring said shoes together beneath the core bars.

11. In a block molding machine of the type including a mold box containing cores supported by core bars extending across the top of the mold box, stripper mechanism for engaging the tops of the molded blocks and means for producing relative movement of the mold box and stripper mechanism in a vertical direction to remove the blocks from the box, an improved stripper mechanism comprising a plurality of stripper heads so arranged that adjancent heads are laterally separated by spaces sufficient to receive the core bars, stripper shoes on the lower ends of said stripper heads so shaped and dimensioned that, when in engagement with the tops of the blocks in the mold box, the adjacent edges of said shoes contact one another in the spaces beneath the core bars which are unoccupied by the cores and the shoes engage substantially the entire area of the top of each block, means for supporting at least some of said stripper heads for pivotal movement about parallel horizontal axes adjacent the upper ends of said heads, and means for producing pivotal movement of said stripper heads about said axes during the relative vertical movement of the mold box and stripper mechanism to first separate said shoes sufficiently to enable the core bars to pass therebetween and to then bring said shoes together beneath the core bars.

12. In a block molding machine of the type including a mold box containing cores supported by core bars extending across the top of the mold box, stripper mechanism for engaging the tops of the molded blocks and means for producing relative movement of the mold box and stripper mechanism in a vertical direction to remove the blocks from the box, an improved stripper mechanism comprising a stripper head supporting member, a stripper head rigidly fixed at its upper end to said supporting member, a pair of movable stripper heads positioned on opposite sides of said fixed head and suspended from said supporting member for pivotal movement about parallel horizontal axes adjacent the upper ends of said heads, each of said movable heads being laterally separated from said fixed head by a space sufficient to receive a core bar, stripper shoes on the lower ends of said stripper heads so shaped and dimensioned that, when in engagement with the tops of the blocks in the mold box, the adjacent edges of said shoes contact one another in the spaces beneath the core bars which are unoccupied by the cores and the shoes engage substantially the entire area of the top of each block, and means for producing pivotal movement of said movable stripper heads about said axes during the relative vertical movement of the mold box and stripper mechanism to first separate said shoes sufficiently to enable the core bars to pass therebetween and to then bring said shoes together beneath the core bars.

13. A stripping mechanism for cored block molding machines comprising a plurality of stripper heads adapted to engage substantially the entire area of the exposed surface of a molded block, means for moving said stripper heads in a vertical direction into and out of engagement with the block, and means for producing limited movement of at least some of said stripper heads in a substantially horizontal direction during said vertical movement thereof.

14. A stripping mechanism for cored block molding machines comprising at least one pair of vertically disposed stripper heads each adapted to engage at its lower end substantially half the area of the top of a molded block, means for moving said stripper heads vertically into and out of engagement with the block, and means for moving at least the lower ends of said stripper heads laterally toward and away from one another during said vertical movement thereof.

15. A stripping mechanism for cored block molding machines comprising a group of three stripper heads adapted to engage substantially the entire area of the exposed surface of a molded block, means for moving said stripper heads in a vertical direction into and out of engagement with the block, and means for moving the lower ends of two of said stripper heads laterally with respect to the third head during said vertical movement thereof.

16. A stripping mechanism for hollow block molding machines comprising a plurality of stripper heads each adapted to engage a portion of the area of the exposed surface of a molded block while the latter is in the mold, a supporting member for said heads, means for connecting at least some of said heads to said supporting member for limited lateral movement thereof relative to adjacent heads, and means for producing said movement.

17. A stripping mechanism for hollow block molding machines comprising a plurality of vertically disposed stripper heads each having a stripper shoe at its lower end adapted to engage a portion of the area of the top of a molded block while the latter is in the mold, a supporting member for said heads, means for connecting the upper ends of said heads to said supporting member, and cam actuated means for producing relative movement of said stripper shoes in a substantially horizontal plane.

18. A stripping mechanism for hollow block molding machines comprising a plurality of stripper heads each adapted to engage a portion of the area of the exposed surface of a molded block while the latter is in the mold, a supporting member for said heads, means for connecting at least some of said heads to said supporting member for pivotal movement about axes parallel to one another and to the block-engaging surfaces of said heads, and means for moving said heads about said axes.

19. A stripping mechanism for hollow block molding machines comprising a group of three stripper heads adapted to engage substantially the entire area of the exposed surface of a molded block while the latter is in the mold, a supporting member for said heads, the middle head of said group being fixedly secured to said supporting member, means for connecting the other two heads to said supporting member for pivotal movement about axes parallel to one another and to the block-engaging surfaces of said heads, and means for moving said last named heads about said axes.

20. A stripping mechanism for hollow block molding machines comprising a plurality of vertically disposed stripper heads each adapted to engage at its lower end a portion of the area of the top of a molded block while the latter is in the mold, a supporting member for said heads, means for connecting the upper ends of at least some of said heads to said supporting member for pivotal movement about parallel horizontal axes, push rods engaging said heads at points offset from said pivotal axes, and means for actuating said push rods so as to move said heads about their pivotal axes.

21. A stripping mechanism for hollow block molding machines comprising a plurality of vertically disposed stripper heads each adapted to engage at its lower end a portion of the area of the top of a molded block while the latter is in the mold, a horizontal supporting member for said heads, means for connecting the upper ends of at least some of said heads to said supporting member for pivotal movement about parallel horizontal axes, vertically movable push rods passing through said supporting member and engaging said heads at points offset from the vertical planes of said pivotal axes, and means carried by said supporting member for engaging the upper ends of said push rods and depressing the same so as to move said heads about their pivotal axes.

22. A stripping mechanism according to claim 21 wherein the push rod depressing means comprises a shaft extending transversely to the pivotal axes of said stripper heads, a radially projecting element fixed to said shaft and extending over the upper ends of said push rods, and means for rocking said shaft so as to bring said element into contact with the upper ends of said push rods.

23. A stripping mechanism according to claim 21 wherein each of said push rods is provided with a collar and a compression spring interposed between said collar and the radially projecting element on said shaft.

24. A stripping mechanism according to claim 21 wherein each of said push rods includes an upper section and a lower section, one of said sections being threaded into the other to enable adjustment of the over-all length of said push rod.

25. A stripping mechanism according to claim 21 wherein each of said push rods includes an upper section and a lower section, one of said sections being threaded into the other to enable adjustment of the over-all length of said push rod, a collar fixed to said upper section, and a compression spring interposed between said collar and the radially projecting element on said shaft.

26. A stripper head for use in a cored block molding machine comprising an elongated body portion, a stripper shoe removably connected to the lower end of said body portion, and means at the upper end of said body portion for suspending the stripper head from a support for pivotal movement about a horizontal axis.

27. A stripper head for use in a cored block molding machine comprising an elongated body portion, a pair of stripper shoes removably connected to the lower end of said body portion in horizontally spaced relation, and means at the upper end of said body portion for suspending the stripper head from a support for pivotal movement about a horizontal axis.

28. A stripper head for use in a cored block molding machine comprising an elongated body portion, a stripper shoe removably connected to the lower end of said body portion having continuous end edges and one continuous side edge, the opposite side edge of said shoe being cut away to conform to the shape of the cored openings in the blocks to be stripped thereby, said cutaway side edge of the stripper shoe projecting outwardly beyond the corresponding side of said body portion, and means at the upper end of said body portion for suspending the stripper head from a support for pivotal movement about a horizontal axis parallel to the side edges of said stripper shoe.

29. A stripper head according to claim 28 wherein the stripper shoe consists of two superposed metal plates of identical horizontal outline, at least the lower plate being symmetrically formed with respect to a median horizontal plane therethrough so as to be invertible to increase the life of the shoe.

30. A stripper head according to claim 28 wherein the stripper shoe consists of two superposed metal plates of identical horizontal outline, the lower plate having all of its side and end edges vertical and the upper plate having its cutaway side edge bevelled inwardly and upwardly toward the continuous side edge thereof.

31. A stripping mechanism for cored block molding machines comprising a plurality of stripper heads adapted to engage substantially the entire area of the exposed surface of a molded block, means for producing relative movement between said block and stripper heads to bring the latter into and out of engagement with the block, and means for producing limited movement of at least some of said stripper heads laterally with respect to the remainder during said relative movement.

32. A stripping mechanism for cored block molding machines comprising a group of three stripper heads adapted to engage substantially the entire area of the exposed surface of a molded block, means for producing relative movement between said block and stripper heads to bring the latter into and out of engagement with the block, and means for moving the lower ends of two of said stripper heads laterally with respect to the third head during said relative movement.

33. A stripping mechanism for cored block molding machines comprising a group of three stripper heads adapted to engage substantially the entire area of the exposed surface of a molded block, and means for producing relative movement between said block and stripper heads to bring the latter into and out of engagement with the block, the lower ends of two of said stripper heads being expansible laterally with respect to the third head during said relative movement.

THOMAS K. ZEVELY.

REFERENCES CITED

The following references are of record in the file of this patent:

UNITED STATES PATENTS

| Number | Name | Date |
|---|---|---|
| 984,985 | Whitehead | Feb. 21, 1911 |
| 1,905,975 | Thomas | Apr. 25, 1933 |
| 2,492,538 | Sansbury | Dec. 27, 1949 |